Patented Dec. 8, 1953

2,662,081

UNITED STATES PATENT OFFICE 2,662,081

PURIFICATION OF SYNTHETIC FOLIC ACID

Arthur R. Hanze, Kalamazoo, Mich., assignor to The Upjohn Company, Kalamazoo, Mich., a corporation of Michigan No Drawing. Application November 30, 1950, Serial No. 198,473

5 Claims. (Cl. 260—251.5)

This invention relates to the purification of a class of nitrogen heterocycles known as the pterins, and in particular to the purification of synthetic liver Lactobacillus casei factor or pteroylglutamic acid.

Several methods for the synthesis of L. casei factor, also known as folic acid and pteroylglutamic acid, have been described by Waller et al., in J. A. C. S. 70 19–28 (1948). All known methods of synthesizing folic acid, which are dependent upon the condensation of various relatively complex acids and complex amines, result in products containing varying proportions of various undesired position isomers, oxidation products, unreacted intermediates, condensation and polymerization products, hydrolysis and degradation products. Many of these side products are closely related to the biologically active folic acid and, as would be expected, possess similar physical and chemical properties, but for the most part are biologically inactive. Folic acid can be separated readily from many of its natural contaminants, but it has been difficult to separate it from those associated pterins which occur in the mixtures resulting from chemical syntheses.

Numerous methods have been described for the purification of folic acid, such as by adsorption on ion-exchange resins, as described by J. J. Pfiffner et al., J. A. C. S. 69 1476 (1947), by solution in alkali and precipitation of the pteroylglutamic acid therefrom at a pH of about 3 to 4, as described by Coy W. Waller in U. S. Patent 2,466,665, or by solution in a strong acid followed by dilution with water to effect precipitation of the dissolved folic acid, as described by Coy W. Waller in U. S. Patent 2,474,022.

Although previously known methods for the purification of synthetic folic acid are satisfactory for the preparation of material containing up to about eighty percent folic acid, they are not very satisfactory for the commercial production of folic acid for pharmaceutical use, since the process must be repeated several times in order to remove the closely related pterins. Also, it is usually desirable finally to crystallize folic acid from water, but as it is soluble in hot water only to the extent of about 0.5 gram per liter, it is apparent that huge volumes of water are needed, which is both inconvenient and expensive. Further, it is usually necessary to use activated carbon to remove any undesirable color; this is unsatisfactory since folic acid is appreciably adsorbed on activated carbon, with the result that considerable folic acid is lost.

It has been found that folic acid of pharmaceutically acceptable purity can be obtained from material containing as little as 65 percent folic acid by intimately contacting an aqueous alkaline solution of such crude folic acid (containing its genetically associated pterins) with a finely divided solid particulate oxide, hydroxide or carbonate of a metal of group II of the periodic table having an atomic number between 12 and 56, both inclusive, for example, calcium hydroxide, separating the solid therefrom, and recovering the folic acid from the clarified alkaline solution. Although calcium hydroxide is preferred, other solid particulate oxides, hydroxides and carbonates of magnesium, calcium, zinc, strontium, cadmium and barium, may be used instead, the following being especially satisfactory: calcium hydroxide, calcium carbonate, magnesium hydroxide, magnesium carbonate, zinc carbonate, magnesium oxide, zinc hydroxide, calcium oxide, zinc oxide, and cadmium carbonate.

Surprisingly, folic acid is not adsorbed by calcium hydroxide and such other oxides, hydroxide and carbonates of group II metals from an alkaline solution while the associated pterins and other coloring matters are strongly adsorbed by the metal oxide, hydroxide or carbonate particles. Most of the undesirable pterins can be thus removed. From ninety to ninety-eight percent of the folic acid originally present in the solution can be recovered in purified form by merely heating the clarified solution to about ninety degrees centigrade, adjusting the pH of the solution to approximately 3.0 and allowing the folic acid to crystallize therefrom.

As excess alkali must be neutralized in order to precipitate the purified folic acid, only an amount of alkali sufficient to dissolve the crude folic acid and its associated genetic impurities should be used, about three molecular equivalents of alkali per mole of folic acid being most satisfactory. Various alkalies can be used to dissolve the crude folic acid, such as ammonium hydroxide and alkali-metal hydroxides, and sodium hydroxide is preferred.

Solutions containing about three to ten grams of folic acid per liter, and preferably such as are concentrated to approximately eight grams per liter, can be treated in accordance with the process of this invention. The crude folic acid can be dissolved directly in the required volume of dilute alkali, or, more conveniently, in a small volume of a one-normal solution of alkali and then diluted to a suitable concentration of folic acid for the subsequent treatment with the oxide, hydroxide or carbonate of the specified group II metals.

As folic acid is not adsorbed appreciably by oxides, hydroxides and carbonates of the specified group II metals, while its genetic impurities are readily adsorbed, the quantity of the solid particulate metal oxide, hydroxide or carbonate employed can be varied over a wide range. However, for economical reasons, a ratio of about one gram of solid particulate metal oxides, hydroxides or carbonates per gram of folic acid is ordinarily satisfactory. Calcium hydroxide, which is the preferred material for use in accordance with the process of this invention, is slightly soluble in water, being more soluble in cold than in hot water (approximately 0.13 gram of CaO per 100 milliliters at 0° C. and approximately 0.06 gram of CaO per 100 milliliters at 100° C.). Accordingly, to obtain the desired adsorption, sufficient calcium hydroxide as discrete particles must be present in the suspension to be effective. Similar considerations apply to the other specified metal oxides, hydroxides and carbonates. The mixture is usually stirred thoroughly for about one hour and one-half at room temperature but shorter or longer periods of time and slightly lower or elevated temperatures can also be employed. If desired, the alkaline solution of folic acid and its genetic impurities can be treated several times with the metal oxide, hydroxide or carbonate, or by successive treatments with different metal oxides, hydroxides and carbonates, in which case the total amount required may be less than that required for a single treatment and a greater amount of folic acid can be recovered in a higher state of purity than by a single treatment.

Although calcium hydroxide (slaked lime) has been referred to as one of the preferred solid adsorbents, equivalent quantities of quicklime (calcium oxide) may be used. Normally the purity of the lime is immaterial and ordinary commercial grades may be used. The lime should be in powdered form, as is obvious, to obtain maximum adsorption efficiency. The same considerations are applicable to treatments in which other metal hydroxides, oxides or carbonates are used.

The metal oxide, hydroxide or carbonate and its adsorbed impurities can be separated from the alkaline solution of folic acid in various conventional ways, such as by filtration or centrifugation. It can be filtered directly if desired, but is most conveniently filtered with a filter aid, such as a diatomaceous earth.

Folic acid is recovered from the purified alkaline solution, in accordance with a preferred embodiment of the process of my invention, by adjusting the pH of the solution to approximately 3.0, whereupon the folic acid precipitates. To obtain folic acid in a crystalline form which is easily filtered, it is preferred to dilute the alkaline solution of purified folic acid to a concentration of about three grams of folic acid per liter, heat the solution to about ninety to ninety-five degrees centigrade and then adjust the pH of the hot solution to approximately 3.0 with dilute hydrochloric acid. The folic acid then slowly crystallizes from the solution.

Although the method of the present invention has been described with particular reference to material containing about 65 to 85 percent folic acid, it can also be used to purify mixtures containing other proportions of folic acid.

The following examples are given by way of illustration only and are not to be construed as limiting.

EXAMPLE 1

An alkaline solution of crude folic acid, prepared by dissolving 26.2 grams of crude folic acid containing 17.2 grams of folic acid (65.6 percent) in 137 milliliters of one-normal sodium hydroxide solution and diluting with 1890 milliliters of water, was mixed with 17.2 grams of calcium hydroxide and stirred at room temperature for approximately one and one-half hours. The resulting suspension was allowed to settle, decanted and the supernatant liquid filtered. The solids were washed with 58.5 milliliters of water, filtered and the filtrates combined and diluted to 5.74 liters. The dilute alkaline solution of clarified folic acid was adjusted to a pH within the range of 8.0 to 10.0 with one-normal hydrochloric acid, heated to approximately ninety to ninety-five degrees centigrade, and its pH adjusted to approximately 3.0 with one-normal hydrochloric acid, added while it was stirred continuously. The resultant slurry was cooled in an ice chest for two days, filtered and the filter cake washed by reslurrying it with 650 milliliters of acidified water having a pH of 3.0, and filtered. The filter cake was then frozen and dried to obtain 16.99 grams of folic acid which contained 7.4 percent moisture and assayed 94.1 percent folic acid on an anhydrous basis.

EXAMPLE 2

A solution of crude folic acid prepared by dissolving 564 grams of crude folic acid containing 489 grams of folic acid in three liters of one-normal sodium hydroxide solution and diluting with 56.4 liters of water, was stirred with 489 grams of calcium hydroxide for one and one-half hours and then filtered through a bed of diatomaceous earth (Celite 545). The clarified alkaline solution of folic acid was then heated to about ninety to ninety-five degrees centigrade and adjusted to a pH of approximately 3.0 with one-normal hydrochloric acid. The resultant slurry was cooled overnight and filtered to obtain 485 grams of a crystalline material containing 90.3 percent folic acid which is suitable for therapeutic use.

EXAMPLE 3

Two and three tenths grams of crude material taining two grams of folic acid was dissolved in fifteen milliliters of one-normal ammonium hydroxide solution and diluted to 250 milliliters with water. A one-hundred-milliliter aliquot of this solution was mixed with 800 milligrams of calcium hydroxide and stirred thoroughly for one and one-half hours. The suspension was filtered and the resulting clarified alkaline solution of folic acid was diluted with 150 milliliters of water and the pH adjusted to approximately 3.0 with one-normal hydrochloric acid. After the acidified solution had stood in an ice box for twenty-four hours, the crystalline folic acid was filtered off and dried to obtain 680 milligrams of material which assayed 89.6 percent folic acid and was of excellent color.

EXAMPLE 4

An aqueous slurry of crude folic acid was dissolved in a minimum amount of five-normal aqueous sodium hydroxide solution and diluted with water to a concentration of 5.11 grams of folic acid per liter.

To 100 milliliters of the above solution was added 510 milligrams of magnesium hydroxide. The resulting suspension was stirred for ninety minutes, 100 milligrams of filter aid (Celite 545) was added, and the mixture was filtered through a bed of filter aid (Celite 545). The filter cake was washed with 25 milliliters of water and the combined filtrates diluted to 200 milliliters. A 190-milliliter aliquot was heated to about 95 degrees centigrade and the pH of the solution adjusted to 3.0 over a period of about fifteen minutes. After the acidified solution had stood in a refrigerator overnight, the precipitate was filtered off and free-dried to obtain 542 milligrams of material which assayed 93.4 percent of folic acid on an anhydrous basis (91 percent recovery).

EXAMPLE 5

A second 100-milliliter aliquot of the folic acid solution used in Example 4 was treated with 510 milligrams of zinc carbonate in a manner similar to that described in Example 4 to obtain 552 milligrams of material which assayed 95 percent folic acid on an anhydrous basis (95.3 percent recovery).

EXAMPLE 6

Chromatography of folic acid

A column was prepared by pouring a slurry composed of 0.5 gram of lime and 1.0 gram of filter aid (Celite 545) in water into a glass tube and allowing the water to drain through. After the water level dropped to just above the top of the column, forty milliliters of a solution, prepared by dissolving 0.5 gram of material containing about 82 percent folic acid in about 3 milliliters of 2.5-normal aqueous sodium hydroxide solution and diluting to 100 milliliters, was added to the top of the column and the effluent was collected. A dark brown band developed in the column and the effluent was bright yellow. It was shown by assay that 94.5 percent of the folic acid originally present was recovered in a purified form.

Inasmuch as the foregoing specification comprises preferred embodiments of the invention, it is to be understood that the invention is not limited thereto and that variations and modifications can be made in a conventional manner by those skilled in the art without departing from the scope of this invention or the claims hereinafter.

I claim:

1. A process of separating synthetic folic acid in highly purified form from genetic impurities associated therewith, which comprises: (1) mixing crude folic acid with an aqueous solution of monovalent-cation-hydroxide selected from the group consisting of alkali-metal hydroxide and ammonium hydroxide to provide an aqueous alkaline monovalent-cation-folate solution having dissolved therein between about three and about ten grams of folic acid per liter; (2) mixing the aqueous alkaline monovalent-cation-folate solution with a solid adsorbent selected from the group consisting of calcium oxide, calcium hydroxide, and calcium carbonate, magnesium oxide, magnesium hydroxide, and magnesium carbonate, zinc oxide, zinc hydroxide, and zinc carbonate, and cadmium carbonate, at about room temperature to adsorb a substantial proportion of the genetic impurities present in the aqueous alkaline monovalent-cation-folate solution on the solid adsorbent while the monovalent-cation-folate remains in solution; (3) separating the solid adsorbent and impurities adsorbed thereon from the aqueous alkaline monovalent-cation-folate solution; and (4) precipitating purified folic acid from the thus-clarified solution by acidification.

2. A process of separating synthetic folic acid in highly purified form from genetic impurities associated therewith, which comprises: (1) mixing crude synthetic folic acid and at least about three moles of aqueous alkali-metal hydroxide per mole of folic acid to provide an aqueous alkaline alkali-metal-folate solution having dissolved therein between about three and about ten grams of folic acid per liter; (2) mixing the aqueous alkaline alkali-metal-folate solution with finely-divided solid absorbent magnesium hydroxide at about room temperature to adsorb a substantial proportion of the genetic impurities present in the aqueous alkaline alkali-metal-folate solution on the solid adsorbent magnesium hydroxide while the alkali-metal-folate remains in solution; (3) separating the solid adsorbent magnesium hydroxide and impurities adsorbed thereon from the aqueous alkaline alkali-metal-folate solution; and (4) precipitating highly purified folic acid from the thus-clarified aqueous alkaline alkali-metal-folate solution by acidification.

3. A process of separating synthetic folic acid in highly purified crystalline form from genetic impurities associated therewith, which comprises: (1) mixing crude synthetic folic acid containing at least about 65 percent folic acid with about three moles of aqueous sodium hydroxide per mole of folic acid to provide an aqueous alkaline solution of sodium folate having dissolved therein about eight grams of folic acid per liter; (2) mixing the aqueous alkaline sodium folate solution with finely-divided solid adsorbent magnesium hydroxide in a ratio of about one gram of magnesium hydroxide to one gram of folic acid at about room temperature to adsorb a substantial proportion of the genetic impurities present in the aqueous alkaline sodium folate solution on the solid adsorbent magnesium hydroxide while the sodium folate remains in solution; (3) separating the solid adsorbent magnesium hydroxide and impurities adsorbed thereon from the aqueous alkaline sodium folate solution; and (4) precipitating highly purified crystalline folic acid from the thus-clarified aqueous alkaline sodium folate solution by dilution to a folic acid concentration of about three grams per liter, heating, acidifying to a pH of about three, and cooling.

4. A process of separating synthetic folic acid in highly purified form from genetic impurities associated therewith, which comprises: (1) mixing crude synthetic folic acid and at least about three moles of aqueous alkali-metal hydroxide per mole of folic acid to provide an aqueous alkaline alkali-metal-folate solution having dissolved therein between about three and about ten grams of folic acid per liter; (2) mixing the aqueous alkaline alkali-metal-folate solution with finely-divided solid adsorbent calcium hydroxide at about room temperature to adsorb a substantial proportion of the genetic impurities present in the aqueous alkaline alkali-metal-folate solution on the solid adsorbent calcium hydroxide while the alkali-metal-folate remains in solution; (3) separating the solid adsorbent calcium hydroxide and impurities adsorbed thereon from the aqueous alkaline alkali-metal-folate solution; and (4) precipitating highly purified folic acid from the thus-clarified aqueous alkaline alkali-metal-folate solution by acidification.

5. A process of separating synthetic folic acid in highly purified crystalline form from genetic impurities associated therewith, which comprises: (1) mixing crude synthetic folic acid containing at least about 65 percent folic acid with about three moles of aqueous sodium hydroxide per mole of folic acid to provide an aqueous alkaline solution of sodium folate having dissolved therein about eight grams of folic acid per liter; (2) mixing the aqueous alkaline sodium folate solution with finely-divided solid adsorbent calcium hydroxide in a ratio of about one gram of calcium hydroxide to one gram of folic acid at about room temperature to adsorb a substantial proportion of the genetic impurities present in the aqueous alkaline sodium folate solution on the solid adsorbent calcium hydroxide while the sodium folate remains in solution; (3) separating the solid adsorbent calcium hydroxide and impurities adsorbed thereon from the aqueous alkaline sodium folate solution; and (4) precipitating highly purified crystalline folic acid from the thus-clarified aqueous alkaline sodium folate solution by dilution to a folic acid concentration of about three grams per liter, heating, acidifying to a pH of about three, and cooling.

ARTHUR R. HANZE.

References Cited in the file of this patent

UNITED STATES PATENTS

| Number | Name | Date |
|---|---|---|
| 2,457,375 | Hutchings | Dec. 28, 1948 |
| 2,520,156 | Lindlar et al. | Aug. 29, 1950 |